J. J. BITTLESTONE & H. T. JOHNSON.
CARGO VESSEL.
APPLICATION FILED DEC. 23, 1914.

1,148,822.

Patented Aug. 3, 1915.
2 SHEETS—SHEET 1.

WITNESSES:
John C. Sanders
A. F. Heuman

INVENTORS:
John James Bittlestone
Henry Thomas Johnson
By Wm Wallace White
ATTY.

J. J. BITTLESTONE & H. T. JOHNSON.
CARGO VESSEL.
APPLICATION FILED DEC. 23, 1914.

1,148,822.

Patented Aug. 3, 1915.
2 SHEETS—SHEET 2.

WITNESSES:
John C. Sanders
A. F. Heuman

INVENTORS:
John James Bittlestone
Henry Thomas Johnson
BY Wm Wallace White ATT'Y

UNITED STATES PATENT OFFICE.

JOHN JAMES BITTLESTONE AND HENRY THOMAS JOHNSON, OF SUNDERLAND, ENGLAND.

CARGO VESSEL.

1,148,822.  Specification of Letters Patent.  Patented Aug. 3, 1915.

Application filed December 23, 1914.  Serial No. 878,676.

*To all whom it may concern:*

Be it known that we, JOHN JAMES BITTLESTONE and HENRY THOMAS JOHNSON, subjects of the King of Great Britain and Ireland, residing at Sunderland, in the county of Durham, England, have invented new and useful Improvements in Cargo Vessels, of which the following is a specification.

This invention relates to cargo vessels for carrying oil and other liquids in bulk. Tank vessels have been proposed having a number of vertical cylindrical tanks formed by a series of semi-circular bulkheads extending between and directly connected to the sides of the vessel so that said tanks form part of the structure of the vessel, such construction being primarily designed to attain unit spaces so large as to be suitable for stowing general cargo when not used for liquid cargo. Such vessels have been provided with side tanks formed between the convex sides of the bulkheads and separated by central longitudinal partitions.

The present invention provides a cargo vessel having an improved construction of tanks solely intended for carrying oil and other liquid in bulk, such construction resulting in increased strength, safety and stability.

According to our invention we provide a cargo vessel with a number of cylindrical tanks, said tanks being independent of the side plating of the vessel though attached thereto, each main tank being provided with a smaller cylindrical tank or tanks. Segmental tanks are also provided at each side between the main tanks, the sides of the main tanks and the segmental tanks together forming an inner skin to the sides of the vessel.

We will fully describe our invention with reference to the accompanying drawings wherein—

Figure 1:
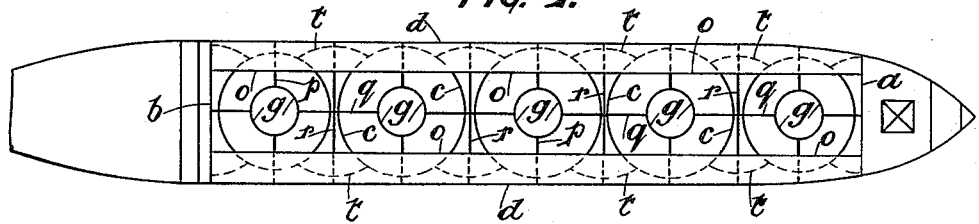
Figure 2:
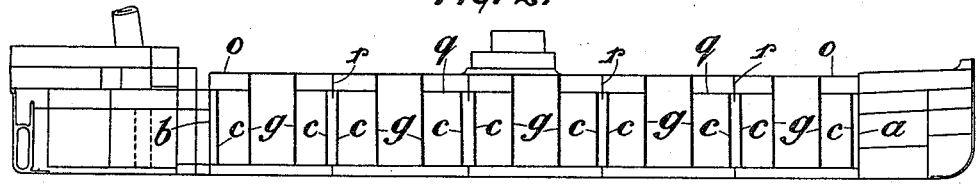
Figure 3:
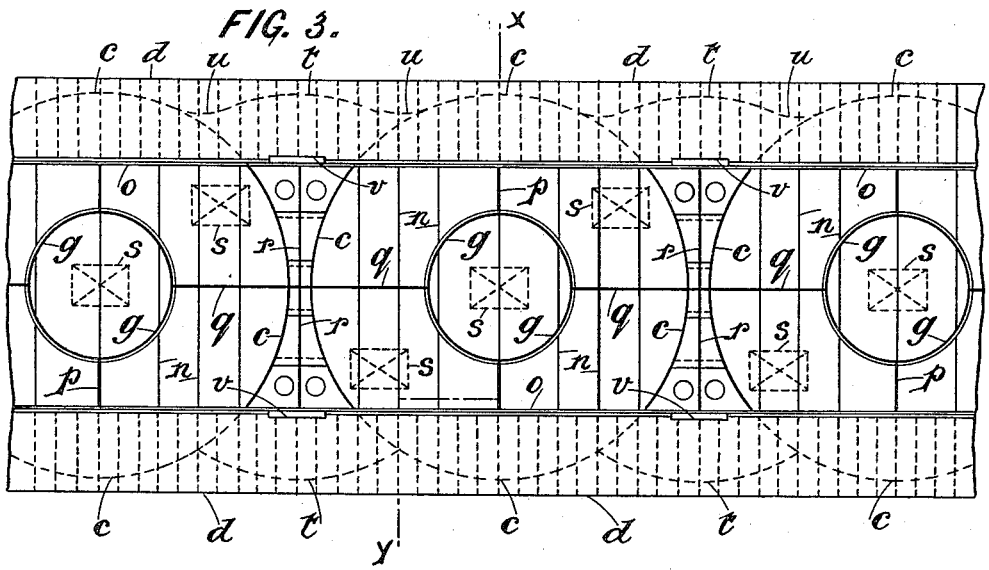
Figure 4:
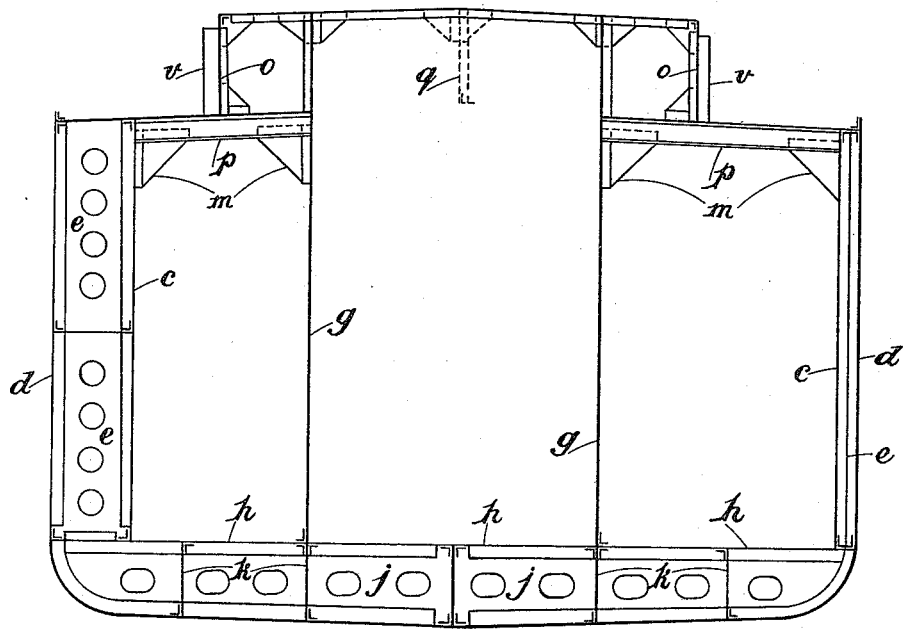
Figure 5:
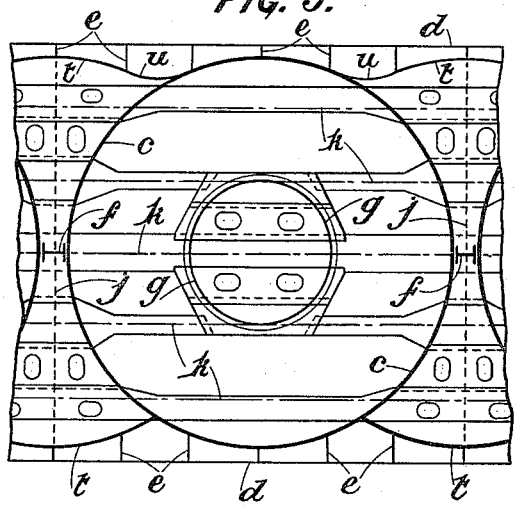

Figure 1 is an outline plan of a cargo vessel in accordance with our invention; and Fig. 2 is a central longitudinal section of Fig. 1. Fig. 3 is a part detail plan, the plating of the trunk top being removed for clearness; Fig. 4 is a transverse section on the line X—Y in Fig. 3; and Fig. 5 is a part detail plan view across the tops of the floors.

Referring to the drawings, in the cargo vessel illustrated the boilers and engines are arranged in the stern portion of the vessel, and, in the space between the fore-peak bulkhead $a$ and the bulkhead $b$ dividing the boilers, engines and the like from the cargo space, we provide a series of cylindrical tanks $c$—$c$, the diameter of each tank being almost equal to the distance between the sides $d$, $d$, of the ship at the point where the tank is situated, and the axes of the tanks lying in the plane of the fore-and-aft center line of the vessel. The main tanks $c$—$c$ are suitably constructed of curved plating strengthened where required by brackets or stiffeners. Vertical web frames $e$—$e$ (Figs. 4 and 5) are arranged between and attached directly or indirectly to the side plating of the vessel and the plating of the main tanks, and vertical frames $f$—$f$ (Fig. 5) are also arranged between and attached to the plating of adjacent main tanks where they approach closest together.

Within and co-axial with each of the main tanks $c$—$c$ we arrange a smaller central cylindrical tank $g$ the diameters of said central tanks being from one quarter to one half of the diameters of the main tanks wherein they are arranged. The central tanks $g$—$g$ are suitably constructed of curved plating strengthened where required by brackets or stiffeners. Each main tank $c$ thus forms an annulus around its central tank $g$.

The main tanks $c$—$c$ and central tanks $g$—$g$ are preferably suitably connected to and extend upward from horizontal plating $h$ (Fig. 4) resting upon the tops of the usual floors or transverse frames $j$—$j$ and longitudinal girders $k$—$k$ supporting the bottom of the ship, as shown, but, in some cases, the main and central tanks may be suitably connected to and extend upward from the bottom plating of the ship. The tops of the main tanks $c$—$c$ are connected by brackets $m$—$m$ (Fig. 4) to the deck beams indicated at $n$—$n$ (Fig. 3) and plating, and where the vessel is provided with a central expansion trunk $o$ running fore and aft above the tanks, the central tanks $g$—$g$ may extend to the top of said expansion trunk $o$ as shown and be supported by and connected to strong transverse beams $p, p$ (Figs. 3 and 4) passing across beneath said trunk, or the central tanks may be stopped off at the deck level. Longitudinal bulkheads $q-q$ and transverse bulkheads $r-r$ are also fitted in the expansion trunk $o$, the longitudinal bulkheads $q-q$ extending between the central tanks $g-g$ and the transverse bulkheads $r-r$ being arranged between the main tanks $c-c$. Suitable hatchways are provided as indicated at $s-s$ (Fig. 3) in the deck and top of the expansion trunk.

At either side and between the adjacent main tanks $c-c$ we provide segmental wing tanks $t-t$ formed by plating curved to a radius approximately equal to that of the main tanks $c-c$ and connected to the plating of said adjacent main tanks. In some cases the plating of the wing tanks $t-t$ will be curved off, as indicated at $u-u$ (Figs. 3 and 5). The corresponding segmental wing tanks at one side are separated from those at the other side by the vertical web frames $f-f$ connecting the adjacent main tanks, and vertical web frames $e-e$ (Figs. 4 and 5) are arranged between and attached directly or indirectly to the side plating $d$ of the vessel and to the plating of the wing tanks $t-t$. The wing tanks may extend upward from the horizontal plating $h$ resting on the floors of the vessel, or from the bottom of the vessel to the deck. Hatchways $v, v$ (Figs. 3 and 4) are provided in the side of the expansion trunk $o$ admitting to the wing tanks $t-t$.

While we have described the main tanks $c-c$ and central tanks $g-g$ as being of circular shape in plan, it will be obvious that they may be of elliptical shape in plan, or of any shape constructed of plane plates approximating to that of a circle or ellipse, as may be convenient. Or corrugated plating may be employed, if desired.

In some cases, where the main tanks are of exceptionally large diameter, instead of providing a single central tank, we may provide two central tanks of convenient diameters, arranged within the main tank.

While we have described our invention as applied to a cargo boat in which the boilers and engines are arranged in the stern portion, if desired the boilers and engines may be arranged amidships and the tanks fitted in the fore and stern portions of the vessel. By suitably removing the interior bulkheads and the like of existing cargo vessels, our improved tank construction can be applied thereto. In this case it may be convenient for the tanks to be connected at their lower ends to and extend upward from the usual inner bottoms or tank top of the vessel.

By our improved construction, we provide a vessel of greater strength and much safer construction than hitherto, as the oil or other fluid or the like is nowhere directly supported by the sides of the vessel, the main and wing tanks forming an inner skin to the vessel. Should the sides of the vessel be pierced or damaged by collision or otherwise, any water leaking therethrough will be confined between the sides of the vessel and the walls of the adjacent main and wing tanks, and, if necessary the corresponding space at the other side of the vessel to that damaged may be flooded to prevent the vessel listing; and the danger of the side plating of the vessel being damaged when lying alongside a quay or wharf or by another vessel and leakage of the oil occurring, will be greatly minimized.

By our improved construction the weight of the cargo will be more suitably distributed, the cost of construction and upkeep will be diminished and increased repair facilities obtained. Moreover the improved construction will tend to produce greater steadiness of the vessel when at sea as, owing to the cylindrical shape of the tanks, the oil or other liquid or the like forming the cargo will take a circular motion under the effect of the ship's motion instead of a side to side motion as in rectangular tanks.

What we claim and desire to secure by Letters Patent is:—

1. A cargo vessel provided with cylindrical tanks, said tanks being independent of the side plating of the vessel though attached thereto, and a smaller tank within each of said cylindrical tanks.

2. A cargo vessel provided with cylindrical tanks, said tanks being independent of the side plating of the vessel though attached thereto, a plurality of segmental tanks, said segmental tanks being disposed at each side between the cylindrical tanks and attached to said cylindrical tanks, and a smaller tank within each of said cylindrical tanks.

3. A cargo vessel provided with cylindrical tanks, said tanks being independent of the side plating of the vessel though attached thereto, a plurality of segmental tanks, said segmental tanks being disposed at each side between the cylindrical tanks and attached to said cylindrical tanks, vertical webs disposed between adjacent cylindrical tanks transversely of the vessel and dividing the segmental tanks and a smaller tank within each of said cylindrical tanks.

4. A cargo vessel provided with cylindrical tanks, said tanks being independent of the side plating of the vessel though attached thereto, a plurality of segmental tanks, said segmental tanks being disposed at each side between the cylindrical tanks and attached to said cylindrical tanks, vertical webs disposed between adjacent cylindrical tanks transversely of the vessel and dividing the segmental tanks, vertical web frames disposed between the cylindrical tanks and the sides of the vessel and a smaller tank within each of said cylindrical tanks.

In testimony whereof we have signed our names to this specification in the presence of two subscribing witnesses.

JOHN JAMES BITTLESTONE.
HENRY THOMAS JOHNSON.

Witnesses:
WILLIAM DAGGETT,
HERBERT HOWARD.